United States Patent
Moran

(10) Patent No.: US 7,667,824 B1
(45) Date of Patent: Feb. 23, 2010

(54) RANGE GATED SHEAROGRAPHY SYSTEMS AND RELATED METHODS

(75) Inventor: Steven E. Moran, Oro Valley, AZ (US)

(73) Assignee: Alpha Technology, LLC, Oro Valley, AZ (US)

( * ) Notice: Subject to any disclaimer, the term of this patent is extended or adjusted under 35 U.S.C. 154(b) by 0 days.

(21) Appl. No.: 12/026,511

(22) Filed: Feb. 5, 2008

Related U.S. Application Data

(60) Provisional application No. 60/899,469, filed on Feb. 6, 2007.

(51) Int. Cl.
*G01C 3/08* (2006.01)
(52) U.S. Cl. .................................................. 356/5.03
(58) Field of Classification Search ........... 356/3.01–22
See application file for complete search history.

(56) References Cited

U.S. PATENT DOCUMENTS

| | | | |
|---|---|---|---|
| 4,139,302 A | 2/1979 | Hung et al. | |
| 4,913,547 A | 4/1990 | Moran | |
| 5,082,362 A * | 1/1992 | Schneiter | 356/3.03 |
| 5,091,776 A | 2/1992 | Tyson | |
| 5,579,103 A | 11/1996 | Tachikawa | |
| 5,608,514 A | 3/1997 | Stann et al. | |
| 5,696,577 A | 12/1997 | Stettner et al. | |
| 6,175,411 B1 | 1/2001 | Telschow et al. | |
| 6,654,401 B2 | 11/2003 | Cavalheiro Vierra et al. | |
| 6,714,286 B1 | 3/2004 | Wheel | |
| 7,027,353 B2 | 4/2006 | Melese et al. | |
| 7,164,787 B1 | 1/2007 | Nevis et al. | |
| 7,164,788 B1 | 1/2007 | Nevis et al. | |
| 7,203,339 B1 | 4/2007 | Nevis | |
| 7,215,826 B1 | 5/2007 | Nevis et al. | |
| 2002/0118352 A1 | 8/2002 | Ohzu et al. | |
| 2003/0095265 A1 * | 5/2003 | Hill | 356/493 |
| 2003/0179382 A1 | 9/2003 | Peterson et al. | |
| 2004/0051877 A1 * | 3/2004 | Erwin | 356/520 |
| 2005/0088644 A1 * | 4/2005 | Morcom | 356/10 |
| 2006/0044546 A1 * | 3/2006 | Lewin et al. | 356/4.04 |
| 2007/0024840 A1 | 2/2007 | Fetzer et al. | |

OTHER PUBLICATIONS

Masahiro Kawakita et al., Gain-modulated Axi-Vision Camera (high speed high-accuracy depth-mapping camera), Optical Society of America, Nov. 1, 2004; vol. 12 No. 22; pp. 5336-5344.
Steven E. Moran et al., "Acoustic Mine Detection Using a Laser Doppler Vibrometer", Kaman Aerospace Corporation, Electro-Optics Development Center, presented at Mine Warfare Conference, Mar. 2000, Naval Postgraduate School, Monterey California, pp. 1-12.

* cited by examiner

*Primary Examiner*—Thomas H Tarcza
*Assistant Examiner*—Luke D Ratcliffe
(74) *Attorney, Agent, or Firm*—Booth Udall, PLC

(57) ABSTRACT

A range-gated shearography system and related methods. Implementations of range-gated shearography systems may include a laser light source, at least one imaging detector coupled to the laser light source, a shearing interferometer coupled to the at least one imaging detector, and a ranging detector coupled to the laser light source. A method of range-gating a shearography system may include emitting laser light, determining a range interval for at least one object, receiving reflected laser light from the at least one object through a shearing interferometer from the range interval, and collecting at least one shearography image.

20 Claims, 3 Drawing Sheets

US 7,667,824 B1

RANGE GATED SHEAROGRAPHY SYSTEMS AND RELATED METHODS

CROSS REFERENCE TO RELATED APPLICATIONS

This document claims the benefit of the filing date of U.S. Provisional Patent Application 60/899,469, entitled "Sensitivity-Modulated Three-Dimensional Imaging and Intensified Range-Gated Shearography" to Steven E. Moran which was filed on Feb. 6, 2007, the disclosure of which is hereby incorporated entirely herein by reference.

BACKGROUND

1. Technical Field

Aspects of this document relate generally to imaging systems.

2. Background Art

Conventional imaging systems vary depending upon the characteristics of the target and the desired image output. For example, camera imaging systems collect visible light reflected and/or emitted from a target and convert the light to an electronic signal using a photodetector. The resulting electronic signal can then be stored in any of a wide variety of retrievable formats on a computer readable medium. Some conventional imaging systems operate by illuminating a target with a light source and measuring properties of the illuminating light reflected back from the target. In some imaging systems, interferometric techniques, such as shearography, measure properties of imaged objects by observing surface vibrations.

SUMMARY

Implementations of range-gated shearography systems may include a laser light source, at least one imaging detector coupled to the laser light source, a shearing interferometer coupled to the at least one imaging detector, and a ranging detector coupled to the laser light source.

Implementations of range-gated shearography systems may include one, all, or any of the following.

The at least one imaging detector may be selected from the group consisting of multiplier phototubes, avalanche photodiodes, a streak tube detector, microchannel plate intensified charge coupled devices, a read-out integrated circuit array, a charge coupled detector, a proximity-focused detector, a high-bandwidth detector, an intensified imaging detector, an unintensified imaging detector, and an SM3D detector.

The ranging detector may be selected from the group consisting of multiplier phototubes, avalanche photodiodes, a streak tube detector, microchannel plate intensified charge coupled devices, a read-out integrated circuit array, a charge coupled detector, a proximity-focused detector, a high-bandwidth detector, an intensified imaging detector, an unintensified imaging detector, and an SM3D detector.

The shearing interferometer may include a shearing wedge.

The shearing interferometer may include a Michelson interferometer.

A second imaging detector may be coupled to the Michelson interferometer.

A video processor may be coupled to the imaging detector.

Implementations of shearography systems may utilize implementations of a first method of range-gating a shearography system. The first method may include emitting laser light, determining a range interval for at least one object, receiving reflected laser light from the at least one object through a shearing interferometer from the range interval, and collecting at least one shearography image.

Implementations of a first method of range gating a shearography system may include one, all, or some of the following.

The range interval may be a depth-of-field (DOF) region for at least one imaging detector.

Determining a range interval may further include measuring the range to the at least one object using a ranging detector coupled with a time-of-flight computer.

Implementations of a second method of range-gating a shearography system may include emitting laser light, receiving reflected laser light from at least one object with a ranging detector, determining a range to the at least one object, and transmitting the range to the at least one imaging detector. The method may also include receiving reflected laser light from the at least one object with the at least one imaging detector through a shearing interferometer and collecting at least one shearography image and processing the at least one shearography image with a video processor.

Implementations of a second method of range-gating a shearography system may include one, all, or some of the following.

Receiving reflected laser light from the at least one object may further include range-gating the at least one imaging detector to receive reflected laser light from the at least one object within a DOF region determined using the range to the at least one object.

Implementations of first and second methods of range-gating a shearography system may include one, all, or some of the following:

The ranging detector may be selected from the group consisting of multiplier phototubes, avalanche photodiodes, a streak tube detector, microchannel plate intensified charge coupled devices, a read-out integrated circuit array, a charge coupled detector, a proximity-focused detector, a high-bandwidth detector, an intensified imaging detector, an unintensified imaging detector, and an SM3D detector.

The at least one imaging detector may be selected from the group consisting of multiplier phototubes, avalanche photodiodes, a streak tube detector, microchannel plate intensified charge coupled devices, a read-out integrated circuit array, a charge coupled detector, a proximity-focused detector, a high-bandwidth detector, an unintensified imaging detector, and an SM3D detector.

The method may include intensifying the received reflected laser light.

Emitting laser light may further include emitting pulses of laser light.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

This disclosure, its aspects and implementations, are not limited to the specific components or assembly procedures disclosed herein. Many additional components and assembly procedures known in the art consistent with the intended shearography systems and/or assembly procedures for a shearography system will become apparent for use with particular implementations from this disclosure. Accordingly, for example, although particular implementations are disclosed, such implementations and implementing components may comprise any shape, size, style, type, model, version, measurement, concentration, material, quantity, and/or the like as is known in the art for such shearography systems and implementing components, consistent with the intended operation. The range-gated shearography method described in this document can also be applied to temporal and spatial phase-stepping shearography systems.

Imaging systems can be constructed to collect information regarding the spatial structure of object surface micro-vibrations. A technique used to collect this information is shearography. Shearography systems may include a camera which views a laser illuminated diffuse reflecting object surface through a shearing interferometer. When two sequential shearing speckle images are subtracted, each recorded under a different state of object surface deformation, speckle fringes result that reveal the spatial structure of object surface dynamic vibrations. As an example of one important application for this technology, shearography systems can be used to detect the presence of acoustically stimulated buried land mines. The range-gated shearography method described in this document, when coupled with an intensified imaging array detector, may enable shearography buried land mine detection at long ranges from remote sensor platforms operating in the presence of a dynamic diffusive medium such as fog, smoke, other battlefield obscurants, and sea water. Relevant teachings regarding the theory and operation of speckle interferometry, shearography and shearography systems may be found in U.S. Pat. No. 4,139,302 to Hung et al., entitled "Method and Apparatus for Interferometric Deformation Analysis," issued Feb. 13, 1979 and in U.S. Pat. No. 4,913,547 to Moran, entitled "Optically Phased-Locked Speckle Pattern Interferometer," issued Apr. 3, 1990, the disclosures of which are hereby incorporated entirely herein by reference.

Structure

Figure 1:
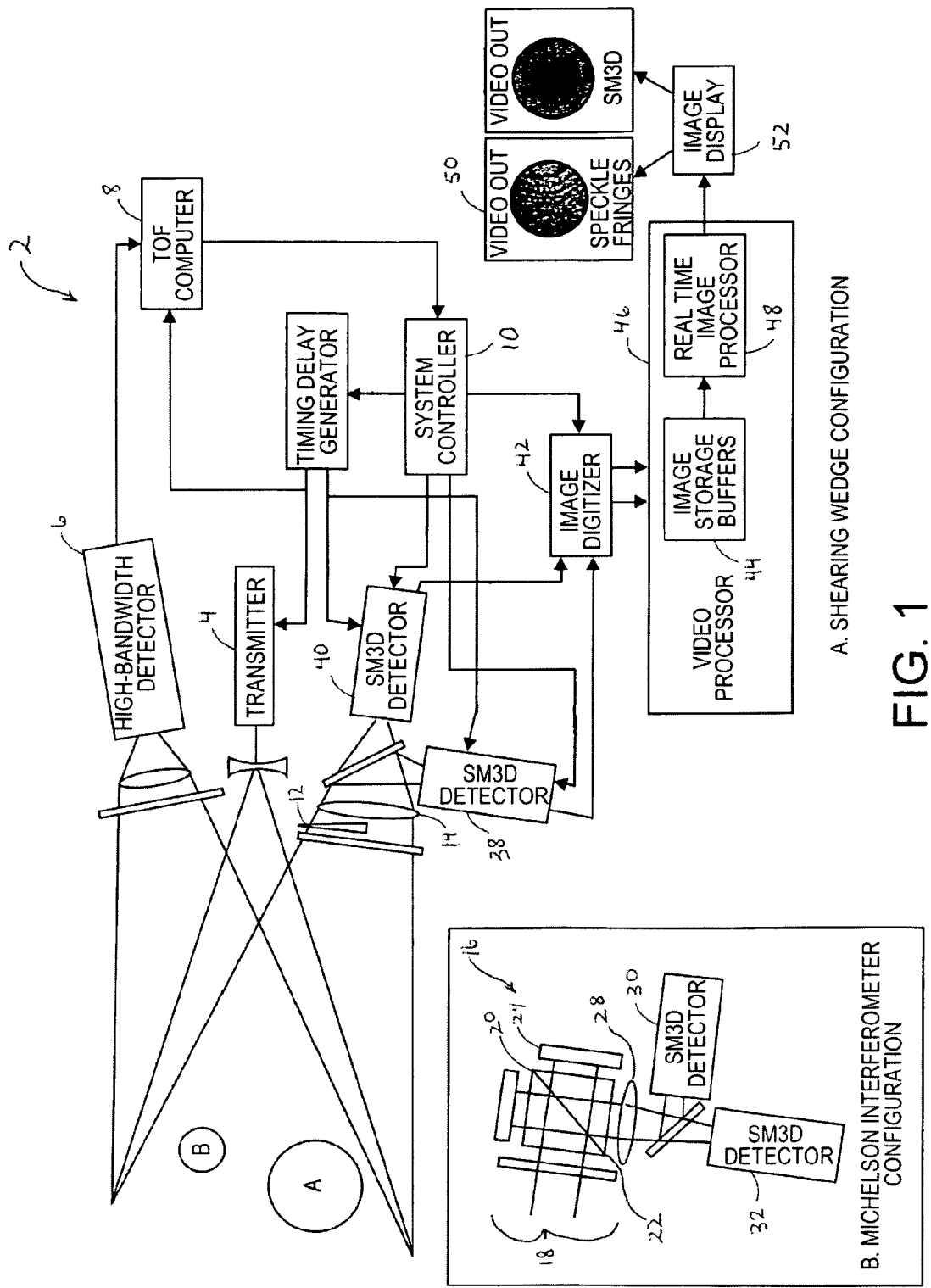
FIG. 1 is a block diagram of two implementations of a range-gated shearography system, illustrating in section A, an implementation with a two-imaging detector shearing wedge interferometer and in section B, an implementation with a two-imaging detector Michelson interferometer.

Referring to FIG. 1, section A, an implementation of a range-gated shearography system 2 is illustrated. The implementation includes a transmitter 4 that emits laser light toward a group of objects of interest (A and B). A ranging detector (high-bandwidth detector 6) is coupled to a time-of-flight (TOF) computer 8 and a system controller 10. A glass shearing wedge 12 is placed over half of a receiver optic's 14 entrance pupil. The glass shearing wedge 12 forms the shearing interferometer element. While a glass shearing wedge 12 is illustrated in FIG. 1, section A, any interferometer configuration that produces two images that are displaced or sheared with respect to one another, such as a Michelson interferometer or a holographic optical element, could also be used.

Figure 2:
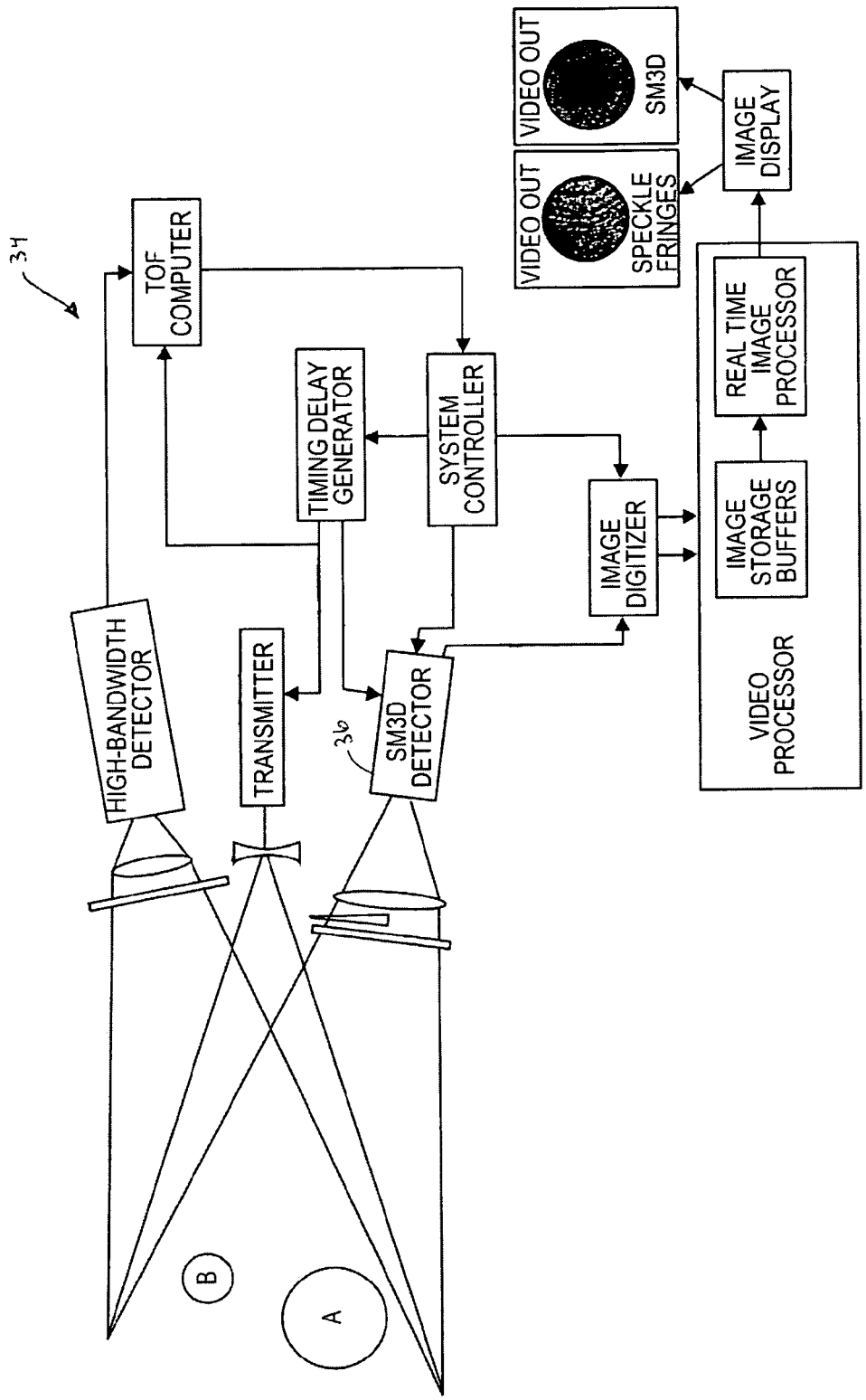
FIG. 2 is a block diagram of an implementation of a range-gated shearography system with a single imaging detector and a shearing wedge interferometer.

Referring To FIG. 1, section B, an implementation of a range-gated shearography system 16 including a Michelson interferometer 18 is illustrated. The Michelson interferometer 18 is formed using a beam splitting cube 20 that includes an internal mirror 22, combined with two mirrors 24 and 26. The mirror 26 is tilted with respect to the normal of mirror 24 to generate a sheared wavefront when reflected laser light is received by the Michelson interferometer 18. The sheared wavefront from mirror 24 and the unsheared wavefront from internal mirror 22 exit the Michelson interferometer 18 and are focused by the lens 28 onto the two imaging detectors (sensitivity modulated three-dimensional (SM3D) detectors) 30 and 32. While the implementations of range-gated shearography systems 2, 16 illustrated in FIG. 1 use two imaging detectors, in other implementations, like the one illustrate in FIG. 2, only one imaging detector 36 may be utilized.

While the range-gated shearography systems 2, 16 illustrated in FIG. 1 utilize SM3D detectors, any imaging detector type could be used, such as, by non-limiting example, multiplier phototubes, avalanche photodiode detectors, streak tube detectors, microchannel plate intensified charge coupled devices, read-out integrated circuit (ROIC) arrays, charge coupled detectors (CCD), intensified and unintensified imaging detectors, SM3D detectors, and any other device or system capable of converting a photon image into photoelectrons. Relevant disclosure regarding the structure and use of these various detector types can be found in U.S. Provisional Patent Application 60/899,469, entitled "Sensitivity-Modulated Three-Dimensional Imaging and Intensified Range-Gated Shearography" to Steven E. Moran filed on Feb. 6, 2007, the disclosure of which was previously incorporated by reference. Relevant teachings regarding the structure and use of SM3D detectors may be found in U.S. patent application Ser. No. 12/026,503 entitled "Light Detection and Ranging Systems and Related Methods," to Steven E. Moran, filed on Feb. 5, 2008, the disclosure of which is hereby incorporated entirely herein by reference.

Imaging detectors like SM3D detectors are intensified imaging detectors, and amplify the electronic signal produced by the received reflected laser photons. The use of intensified imaging detectors may be particularly useful in range-gated shearography systems because of their high sensitivity and resulting image enhancing qualities.

Use

When reflected laser light from at least one of the objects is received by the shearing interferometer (whether a glass shearing wedge 12, a Michelson interferometer 18, or another shearing interferometric system), the interferometer forms two identical speckle images of the object surface on the imaging detector 21 which are laterally shifted, or sheared, by an amount defined by the parameters of the shearing interferometer. If the temporal coherence length of the laser exceeds the optical path length difference between two "arms" of the interferometer, the two speckle images will interfere, forming a first speckle pattern or first composite image (the result of adding the two speckle images) which differs from the two input speckle images in both its brightness distribution and spatial structure.

Heuristically, each image speckle, which is nominally the size of the Airy disc for the imaging system, can be viewed as one arm of a micro-interferometer. The size of the Airy disk is approximately $1.22 \lambda F(1/(1-f/d_0))$, where F is the imaging system F-number, $\lambda$ is the wavelength of the laser illumination, f is the lens focal length, and $d_0$ is the distance from the lens principal plane to the rough surface. The amplitude and phase of the field within a given speckle is nominally a constant over the speckle linear dimension. When two speckles from different image locations are added, as in the shearing interferometer, the two arms of the micro-interferometer correspond to the speckle fields associated with two image points which are separated by the shear distance.

Referring to FIG. 1, section A, an implementation of a range-gated shearography system 2 may operate by the transmitter 4 emitting laser light toward the objects of interest. Resulting reflected laser light from the objects of interest enters the high-bandwidth detector 6 which transmits a signal to the TOF computer 8. The TOF computer 8 computes the time of flight of the reflected laser light by receiving from the system controller 10 the time the transmitter 4 emitted the laser light and using the signal from the high-bandwidth detector 6. With the time-of-flight information, the range-gated shearography system 2 calculates the range or range interval that includes the distance from the system 2 to at least one of the objects in the field of view. The range-gated shearography system 2 then communicates the range to the imaging detectors 38, 40.

In particular implementations, one of the characteristics of the imaging detectors 38, 40 may be their operation within a specific depth-of-field (DOF) region. In other words, the detectors may be configured to collect data within a predefined window of range values based on the values of certain input parameters. While the DOF of various imaging detectors is influenced by many factors and enhanced by many methods and structures, many implementations of imaging detectors allow configuration within a specific DOF region, range interval, or predefined window of range values. The values of and the physical location of the particular DOF region may be determined by the range-gated shearography system 2.

Accordingly, when the range-gated shearography system 2 communicates the range to the imaging detectors 38, 40 either through the system controller 10 or another system component, the imaging detectors 38, 40 may be set to receive and or process reflected laser light from within or from a particular DOF region or range interval. The process of determining the range interval at which the imaging detectors 38, 40 should be operated may be called "range-gating." "Range-gating" an implementation of a shearography system, then, describes the process of finding the range to at least one object of interest, calculating the range interval, and communicating the range interval to at least one imaging detector 38. Once the at least one imaging detector in the range-gated shearography system has been set to collect images from within the range interval, the at least one imaging detector 38 may begin collecting shearographic images.

Referring to FIG. 1, section A, the shearographic images collected may include a first speckle pattern formed which is digitized by an image digitizer 42 and stored in frame buffers 44 that reside in the video processor 46. Because of the action of various natural and/or anthropogenic sources, by the time the next speckle pattern is received and stored, the object's surface may be deformed from its state in the first speckle pattern. The deformation can be the result of surface vibrational motion, thermal stressing, or mechanical loading. A first composite image is then formed by adding the first and second speckle patterns, digitizing the image, and storing it in the frame buffers 44. A second composite image is formed by repeating the process of adding two sheared speckle images on the imaging detector 38. The second composite image is then digitized and stored in frame buffers 44.

When the first composite image is subtracted for the second composite image using the real-time image processor 48, speckle fringes or contours result, as is illustrated by a speckle contour image 50 of the object, which is a sphere. The speckle contour image 50 reveals the spatial structure of the micro-displacements of the object surface. The resulting speckle contour image 50 is displayed on the image display 52.

In particular implementations of range-gated shearography systems, the transmitter 4 may emit pulses of laser light, rather than producing light continuously. In these implementations, depending upon the implementations of imaging detectors 38, 40 used, shearographic images may be generated either with each laser pulse (at the laser pulse repetition frequency (PRF)) or with every two laser pulses (at half the PRF). In particular implementations, the "live" fringes of a moving surface can be generated using a method of processing real time digitized composite video at the laser PRF by sequentially subtracting the real-time video from the digitized composite image from previously digitized and stored video frames which reside in the image storage buffers 44.

Figure 3:
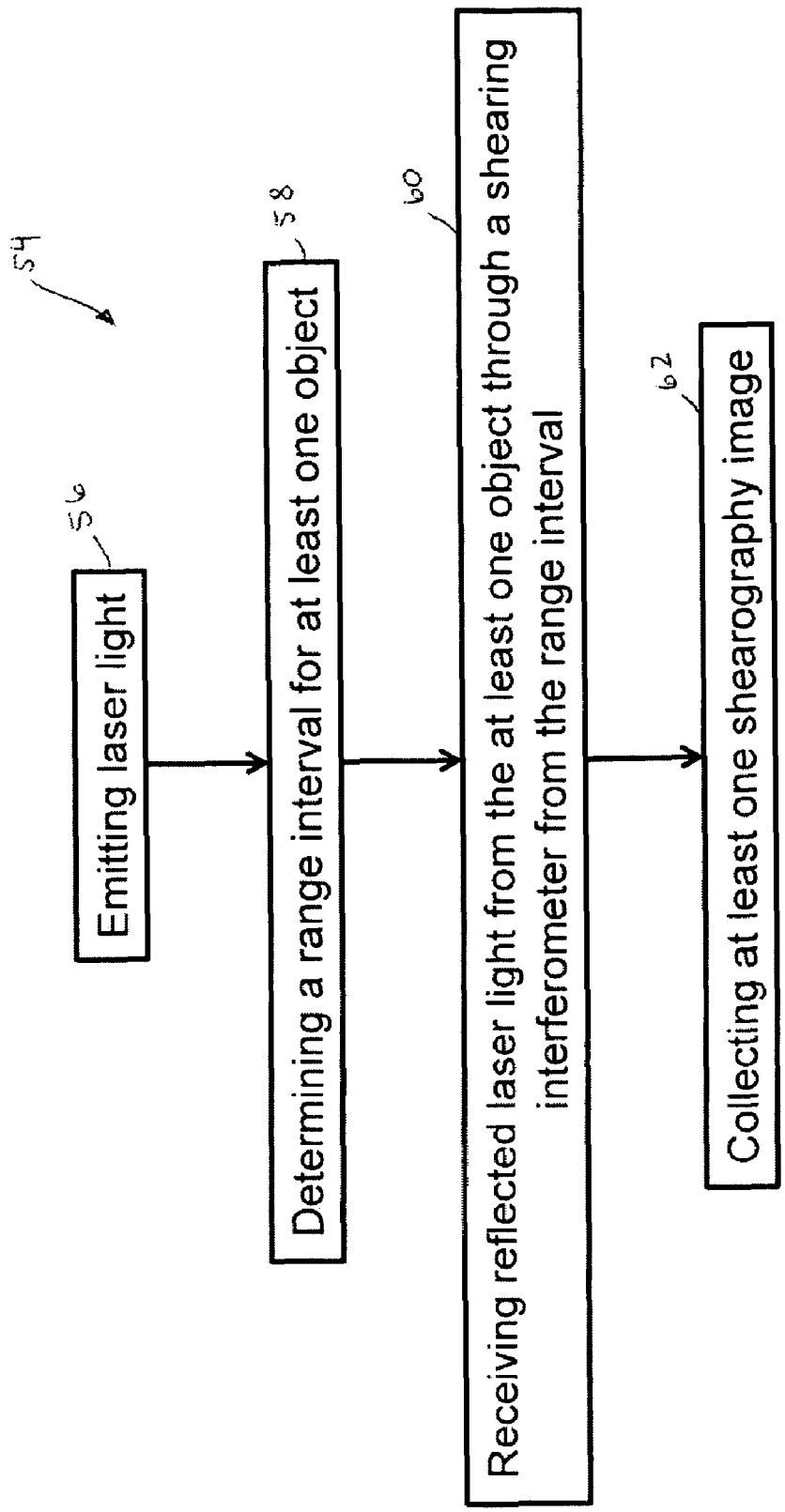
FIG. 3 flow diagram of an implementation of a method of range-gating a shearography system.

Implementations of range-gated shearography systems may utilize a method of range-gating a shearography system. Referring to FIG. 3, a particular implementation of a method of range-gating a shearography system 54 is illustrated. The method 54 may include emitting laser light (step 56), determining a range interval for at least one object (step 58), receiving reflected laser light from the at least one object through a shearing interferometer from the range interval (step 60), and collecting at least one shearography image (step 62). Implementations may also include the steps of intensifying received reflected laser light and emitting pulses of laser light. The step of intensifying received reflected laser light may include, by non-limiting example, intensifying the received light itself, intensifying a photoelectronic image corresponding to the received light, or any other method of intensifying light or a light-related image.

Implementations of range-gated shearography systems may include imaging detectors that are intensified, such as, by non-limiting example, SM3D imaging detectors, intensified charged coupled detectors, or any other detector capable of intensifying a photoelectric signal generated from a photon image. In particular implementations, intensification may provide the sensitivity necessary for operation of the shearography system at lower laser illumination levels and/or longer ranges despite scattering and absorbing media such as sea water, smoke, haze and fog. Since the backscattered light from the scattering medium contains little information regarding the surface shape or spatial vibrational structure, it is a source of noise to the system. Implementations of range-gated shearography systems that include both intensified imaging detectors and operate in a range-gated mode may decrease the impact of scattering media and improve the signal-to-noise ratios of the resulting shearography imagery.

It will be understood that implementations are not limited to the specific components disclosed herein, as virtually any components consistent with the intended operation of a method and/or system implementation for a range-gated shearography system may be utilized. Accordingly, for example, although particular shearing wedges, imaging detectors, and ranging detectors may be disclosed, such components may comprise any shape, size, style, type, model, version, class, grade, measurement, concentration, material, weight, quantity, and/or the like consistent with the intended operation of a method and/or system implementation for a range-gated shearography system may be used.

In places where the description above refers to particular implementations of range-gated shearography systems, it should be readily apparent that a number of modifications may be made without departing from the spirit thereof and that these implementations may be applied to other range-gated shearography systems.

The invention claimed is:

1. A range gated shearography system comprising:
   a laser light source;
   at least one imaging detector coupled to the laser light source;
   a shearing interferometer coupled to the at least one imaging detector; and
   a ranging detector coupled to the laser light source.

2. The system of claim 1, wherein the at least one imaging detector is selected from the group consisting of multiplier phototubes, avalanche photodiodes, a streak tube detector, microchannel plate intensified charge coupled devices, a read-out integrated circuit array, a charge coupled detector, a proximity-focused detector, a high-bandwidth detector, an intensified imaging detector, an unintensified imaging detector, and an SM3D detector.

3. The system of claim 1, wherein the ranging detector is selected from the group consisting of multiplier phototubes, avalanche photodiodes, a streak tube detector, microchannel plate intensified charge coupled devices, a read-out integrated circuit array, a charge coupled detector, a proximity-focused detector, a high-bandwidth detector, an intensified imaging detector, an unintensified imaging detector, and an SM3D detector.

4. The system of claim 1, wherein the shearing interferometer comprises a shearing wedge.

5. The system of claim 1, wherein the shearing interferometer comprises a Michelson interferometer.

6. The system of claim 5, wherein a second imaging detector is coupled to the Michelson interferometer.

7. The system of claim 1, further comprising a video processor coupled to the imaging detector.

8. A method of range-gating a shearography system comprising:
   emitting laser light;
   determining a range interval for at least one object;
   receiving reflected laser light from the at least one object through a shearing interferometer from the range interval; and
   collecting at least one shearography image.

9. The method of claim 8, wherein the range interval is a DOF region for at least one imaging detector.

10. The method of claim 8, wherein determining a range interval further comprises measuring the range to the at least one object using a ranging detector coupled with a time-of-flight computer.

11. The method of claim 10, wherein the ranging detector is selected from the group consisting of multiplier phototubes, avalanche photodiodes, a streak tube detector, microchannel plate intensified charge coupled devices, a read-out integrated circuit array, a charge coupled detector, a proximity-focused detector, a high-bandwidth detector, an intensified imaging detector, an unintensified imaging detector, and an SM3D detector.

12. The method of claim 9, wherein the at least one imaging detector is selected from the group consisting of multiplier phototubes, avalanche photodiodes, a streak tube detector, microchannel plate intensified charge coupled devices, a read-out integrated circuit array, a charge coupled detector, a proximity-focused detector, a high-bandwidth detector, an unintensified imaging detector, and an SM3D detector.

13. The method of claim 9, further comprising intensifying the received reflected laser light.

14. The method of claim 8, wherein emitting laser light further comprises emitting pulses of laser light.

15. A method of range-gating a shearography system comprising:
   emitting laser light;
   receiving reflected laser light from at least one object with a ranging detector;
   determining a range to the at least one object;
   transmitting the range to at least one imaging detector;
   receiving reflected laser light from the at least one object with the at least one imaging detector through a shearing interferometer and collecting at least one shearography image;
   processing the at least one shearography image with a video processor.

16. The method of claim 15, wherein the at least one imaging detector is selected from the group consisting of multiplier phototubes, avalanche photodiodes, a streak tube detector, microchannel plate intensified charge coupled devices, a read-out integrated circuit array, a charge coupled detector, a proximity-focused detector, a high-bandwidth detector, an unintensified imaging detector, and an SM3D detector.

17. The method of claim 15, wherein the ranging detector is selected from the group consisting of multiplier phototubes, avalanche photodiodes, a streak tube detector, microchannel plate intensified charge coupled devices, a read-out integrated circuit array, a charge coupled detector, a proximity-focused detector, a high-bandwidth detector, an intensified imaging detector, an unintensified imaging detector, and an SM3D detector.

18. The method of claim 15, further comprising intensifying the received reflected laser light.

19. The method of claim 15, wherein emitting laser light further comprises emitting pulses of laser light.

20. The method of claim 15, wherein receiving reflected laser light from the at least one object further comprises range-gating the at least one imaging detector to receive reflected laser light from the at least one object within a DOF region determined using the range to the at least one object.

* * * * *